(12) United States Patent
Lee et al.

(10) Patent No.: US 8,301,406 B2
(45) Date of Patent: Oct. 30, 2012

(54) METHODS FOR PROGNOSING MECHANICAL SYSTEMS

(75) Inventors: Jay Lee, Mason, OH (US); Linxia Liao, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 498 days.

(21) Appl. No.: 12/508,836

(22) Filed: Jul. 24, 2009

(65) Prior Publication Data

US 2010/0023307 A1    Jan. 28, 2010

Related U.S. Application Data

(60) Provisional application No. 61/083,341, filed on Jul. 24, 2008.

(51) Int. Cl.
*G01R 23/16* (2006.01)
(52) U.S. Cl. ........................................................ 702/77
(58) Field of Classification Search .................... 702/77; 714/26
See application file for complete search history.

(56) References Cited

U.S. PATENT DOCUMENTS 7,882,394 B2 *   2/2011   Hosek et al. .................... 714/26

OTHER PUBLICATIONS

DePold, H.R. and Gass, F.D., "The application of expert systems and neural networks to gas turbine prognostics and diagnostics", Journal of Engineering for Gas Turbines and Power-transactions of the Asme, 121 p. 607-612, 1999.
Swanson, N.R. and White, H., "A model selection approach to assessing the information in the term structure using linear models and artificial neural networks", Journal of Business & Economic Statistics, 13(3), p. 265-275, 1995.
Bossaerts, P. and Hillion, P., "Implementing statistical criteria to select return forecasting models: What do we learn?" Review of Financial Studies, 12(2): p. 405-428, 1999.
Kasabov, N.K. and Song, Q., "DENFIS: Dynamic evolving neural-fuzzy inference system and its application for time-series prediction", IEEE Transactions of Fuzzy Systems, 10(2): p. 144-154, 2002.
Samejima, K., Katagiri, K., Doya, K., and Kawato, M., "Multiple model-based reinforcement learning for nonlinear control", Electronics and Communications in Japan Part III, 89(9) p. 54-69, 2006.
Gimenez-Guzman, J.M., Martinez-Bauset, J., and PLA, V. "A reinforcement learning approach for admission control in mobile multimedia networks with predictive information", LEICE Transactions on Communications, E90B(7): p. 1663-1673, 2007.

(Continued)

*Primary Examiner* — Jonathan C Teixeira Moffat
*Assistant Examiner* — Xiuquin Sun
(74) *Attorney, Agent, or Firm* — Dinsmore & Shohl LLP

(57) ABSTRACT

A method of prognosing a mechanical system to predict when a failure may occur is disclosed. Measurement data corresponding to the mechanical system is used to extract one or more features by decomposing the measurement data into a feature space. A prediction model is then selected from a plurality of prediction models for the one or more features based at least on part on a degradation status of the mechanical system and a reinforcement learning model. A predicted feature space is generated by applying the selective prediction model to the feature space as well as a confidence value by comparing the predicted feature space with a normal baseline distribution, a faulty baseline distribution, or a combination thereof. A status of mechanical system based at least in part on the confidence value is then provided.

23 Claims, 4 Drawing Sheets

OTHER PUBLICATIONS

Kaelbling; L.P., Littman, M.L. and Moore, A.W., "Reinforcement learning: A survey", Journal of Artificial Intelligence Research, 4: p. 237-285, 1996.

Dimitrakakis, C. and Bengio, S., "Online adaptive policies for ensemble classifiers", Neurocomputing, 64 p. 211-221, 2005.

Liu, S. and Nagao, T., "HXCS and its application to financial time series forecasting", IEEJ Transactions on Electrical and Electronic Engineering, 1(4): p. 417-425, 2006.

Lee, J.W. Park, J., O, J., Lee, J., and Hong, E., "A Multiagent approach to Q-learning for daily stock trading", IEEE Transactions on Systems man and Cybernetics Part a—Systems and Humans, 37(6): p. 864-877, 2007.

Goumas, S.K., Zervakis, M.E. and Stavrakakis, G.S., "Classification of washing machines vibration signals using discrete wavelet analysis for feature extraction", IEEE Transactions on Instrumentation and Measurement, 51(3): p. 497-508, 2002.

Duda, R.O., Hart, P.E., and Stork, D.G., "Pattern Classification", 2nd ed, New York: John Wiley & Sons, 2001, p. 115-117, 124-126, 487-489.

Zhong, F., Shi. T. and He. T., "Fault diagnosis of motor bearing using self-organizing maps", In Proceedings of the Eighth International Conference on Electrical Machines and Systems, 2001.

Kohonen, T., "The self-organizing map", Proceedings of the IEEE, 78(9): p. 1464-1480, 1990.

Kennedy, J., and Eberhart, R., "Particle swarm optimization", In Neural Networks, 1995. Proceedings., IEEE International.Conference on Neural Networks, 1995.

Schwartz, G., "Estimating the Dimension of a Model", The Annals of Statistics, 6(2): p. 461-464, 1978.

Song, X., Yang, K., and Pavel, M., "Density Boosting for Gaussian Mixtures", In Neural Information Processing, Berlin Heidelberg: Springer-Verlag, p. 508-515, 2004.

Wang, F., Zhang, C., and Lu, N., "Boosting GMM and its Two Applications", In Multiple Classifier Systems. Berlin Heidelberg: Springer-Verlag, p. 12-21, 2005.

Fukunaga, K., "Introduction to Statistical Pattern Recognition", 2nd ed. Boston: Academic Press, p. 444-447, 1990.

Qiu, H. and Lee, J., "Feature fusion and degradation detection using self-organizing map", In Proceedings of the 2004, International Conference on Machine Learning and Applications, ICMLA '04, 2004.

Qiu, H., Lee, J., Lin, J., and Yu, G., "Robust performance degradation assessment methods for enhanced rolling element bearing prognostics", Advanced Engineering Informatics, 17 p. 127-140, 2003.

Malhotra, R., "Meta-modeling framework: A new approach to manage meta-modelbase and modeling knowledge", Knowledge-Based Systems, 21(1): p. 6-37, 2008.

Wang, P. and Vachtsevanos, G., "Fault prognostics using dynamic wavelet neural networks", Artificial Intelligence for Engineering Design, Analysis and Manufacturing: AIEDAM, 15: p. 349-365, 2001.

Korbicz, J. and Kowal, M., "Neuro-fuzzy networks and their application to fault detection of dynamical systems", Engineering Applications of Artificial Intelligence, 20 p. 609-617, 2007.

Djurdjanovic, D., Lee, J. and Ni, J., "Watchdog agent—An infotronics-based prognostics approach for product performance degradation assessment and prediction", Advanced Engineering Informatics, 17 p. 109-125, 2003.

Reichart, K.M., Van Dyke, M., and Maynard, K., "Application of sensor fusion and signal classification techniques in a distributed machinery condition monitoring system", Proceedings of SPIE vol. 4051—The International Society for Optical Engineering, 2000.

Roemer, M.J., Kacprzynski, G.J., and Orsagh, R.F., "Assessment of data and knowledge fusion strategies for prognostics and health management", IEEE Aerospace Conference Proceedings, 2001.

Li, Y., Kurfess, T.R., and Liang, S.Y., "Stochastic prognostics for rolling element bearings", Mechanical Systems and Signal Processing, 14(5): p. 747-762, 2000.

Tabbane, N., Tabbane S., and Mehaoua, A., "Autoregressive, Moving Average and Mixed Autoregressive-Moving Average Process for Forecasting Qos in Ad Hoc Networks for Realtime Service Support", Vehicular Technology Conference, 2004.

Beligiannis, G., Likothanassis, S., and Skarlas, L., "Evolutionary multi-model estimators for ARMA system modeling and time series prediction", Artificial Neural Nets Problem Solving Methods, p. 409-416,2003.

Tse, P.W. and Atherton, D.P., "Prediction of machine deterioration using vibration based fault trends and recurrent neural networks", Journal of Vibration and Acoustics—Transactions of the Asme, 121 p. 355-362, 1999.

Zhang, S. and Ganesan, R., "Multivariable trend analysis using neural networks for intelligent diagnostics of rotating machinery". Journal of Engineering for Gas Turbines and Power-Transactions of the Asme, 119 p. 378-384, 1997.

Wang, W.Q., Golnaraghi, M.F., and Ismail, F., "Prognosis of machine health condition using neuro-fuzzy systems", Mechanical Systems and Signal Processing, 18 p. 813-831, 2004.

Juang, C.F. "A Hybrid of genetic algorithm and particle swarm optimization for recurrent network design", IEEE Transactions on Systems, Man, and Cybernetics—Part B-Cybernetics, 34(2): p. 997-1006, 2004.

Yu, J., Wang, S., and Xi, L., "Evolving artificial neural networks using an improved PSO and DPSO", Neurocomputing, 71 p. 1054-1060, 2008.

Yi-Hui, L., "Evolutionary neural network modeling for forecasting the field failure data of repairable systems", Expert Systems with Applications, 33 p. 1090-1096, 2007.

Wang, W., "An adaptive predictor for dynamic system forecasting", Mechanical Systems and Signal Processing, 21 p. 809-823, 2007.

Liu, F., Ng, G.S., and Quek, C., "RLDDE: A novel reinforcement learning-based dimension and delay estimator for neural networks in time series prediction", Neurocomputing, 70 p. 1331-1341, 2007.

Li, Y., Billington, S., Zhang, C., Kurfess, T., Danyluk, S., and Liang, S., "Adaptive prognostics for rolling element bearing condition", Mechanical Systems and Signal Processing, 13(1): p. 103-113, 1999.

* cited by examiner

METHODS FOR PROGNOSING MECHANICAL SYSTEMS

CROSS REFERENCE TO RELATED APPLICATIONS

This patent application claims priority to provisional application No. 61/083,341, filed Jul. 24, 2008, the entirety of which is incorporated by reference.

TECHNICAL FIELD

The present invention generally relates to prognosing mechanical systems and, specifically, to predicting when a failure may occur.

BACKGROUND

As background, unexpected machine downtime is still one of the major issues impacting machining productivity in industry. For example, every minute of downtime in an automotive manufacturing plant could be quite costly, as the breakdown of one machine may result in the halt of the entire production line in a manufacturing facility. As machine tools become more complex and sophisticated, the reliability of the machining equipment becomes more crucial. Most machine maintenance today is either purely reactive (reactive maintenance) or blindly proactive (preventive maintenance), both of which could be extremely wasteful.

Predictive maintenance focuses on failure prediction in order to prevent failures in advance, and offers sufficient information to improve overall maintenance scheduling. For decades, researchers and practitioners have been trying to develop and deploy prognostics technologies with ad hoc and trial-and-error approaches. These efforts have resulted in limited success, due to the fact that a systematic approach in deploying the right prognostics models for the right applications has yet to be developed.

Before the deployment of the right prognostics models, several factors for complex systems, such as stability properties and modeling assumptions and operating conditions, must be taken into consideration. Stability properties and modeling assumptions are important for building physics models for a controller or machine process. Operating conditions, such as shaft speed, load, feed rate and cutting materials, are also important factors for prognostic models since the degradation patterns of the machine may be distinct under different operating conditions. A system's full range of operating states may be decomposed into four overlapping operating conditions based on two principle parameters, which may include shaft speed, load, feed rate, and cutting materials, etc. Under a certain operating condition (e.g. low speed cutting of a soft material), the degradation pattern of the machine may be a slow and stationary process; while under another operating condition (e.g. high speed cutting of a hard material), the degradation pattern may show non-stationary characteristics with a faster degradation rate towards failure. It may be difficult for an individual prognostic model to meet the accuracy requirements for prediction when the machine operating condition changes.

Many system components can undergo a long degradation process before catastrophic failures occur. If a certain operating condition is continuously examined, the degradation status of the component will change over time. Performance indices (e.g., "1" meaning normal, and "0" meaning unacceptable) may be stable in the range of 0.9 to 1.0 at the beginning. As the initial faults develop over time, a degradation trend appears in the performance indices. At the final stage of the degradation, the trend of the performance indices drops quickly towards 0. An individual model cannot always meet the accuracy requirements for prediction when the machine degradation status changes overtime. Some prediction models are only appropriate for specific degradation patterns. These models may fail to learn and predict for aliasing degradation patterns accurately. A method which incorporates multiple prediction models may solve this issue, while the challenge still remains in how to autonomously shift among these multiple models to improve the prediction accuracy.

Therefore, novel methods are disclosed to address the challenges of performance degradation identification, adaptive prediction model selection and performance index generation for robust prognostics. These methods leverage the machine prognostics strategy both in autonomy and accuracy.

SUMMARY

The present disclosure generally relates to a method of prognosing a mechanical system comprising receiving measurement data corresponding to the mechanical system; extracting one or more features from the received measurement data by decomposing the measurement data into a feature space; selecting a prediction model from a plurality of prediction models for one or more features based at least on part on a degradation status of the mechanical system and a reinforcement learning model; generating a predicted feature space by applying the selective prediction model to the feature space; generating a confidence value by comparing the predicted feature space with a normal baseline distribution, a faulty baseline distribution, or a combination thereof; and providing a status of mechanical system based at least in part on the confidence value.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

1 Overview

The embodiments described herein generally relate to methods for adaptive modeling for robust prognostics for mechanical systems and are aimed at dynamically selecting the most appropriate prediction models under different machine degradation statuses. To tackle these challenges, the disclosed methods comprise three major tasks: identification of the machine degradation status, reinforcement learning-based framework for adaptive prediction model selection, and a method to improve the accuracy of the predicted performance index calculation.

2 Framework

As discussed herein, the adaptive reinforcement learning-based modeling focuses on providing a recommendation of the most appropriate prediction model according to different machine degradation statuses. An effective method to identify the degradation status needs to be developed before applying the reinforcement learning framework. The reinforcement learning algorithm will interact with the available historical data and "learn" to select the most appropriate prediction model when the machine is in a certain degradation status. This learning procedure yields a "look-up table" based on which the appropriate prediction models can be selected. The reinforcement learning scheme can be updated to provide a new look-up table for prediction model selection when new observations are available. When performing online testing, the appropriate prediction models will be selected according to the results of the look-up table.

Figure 1:
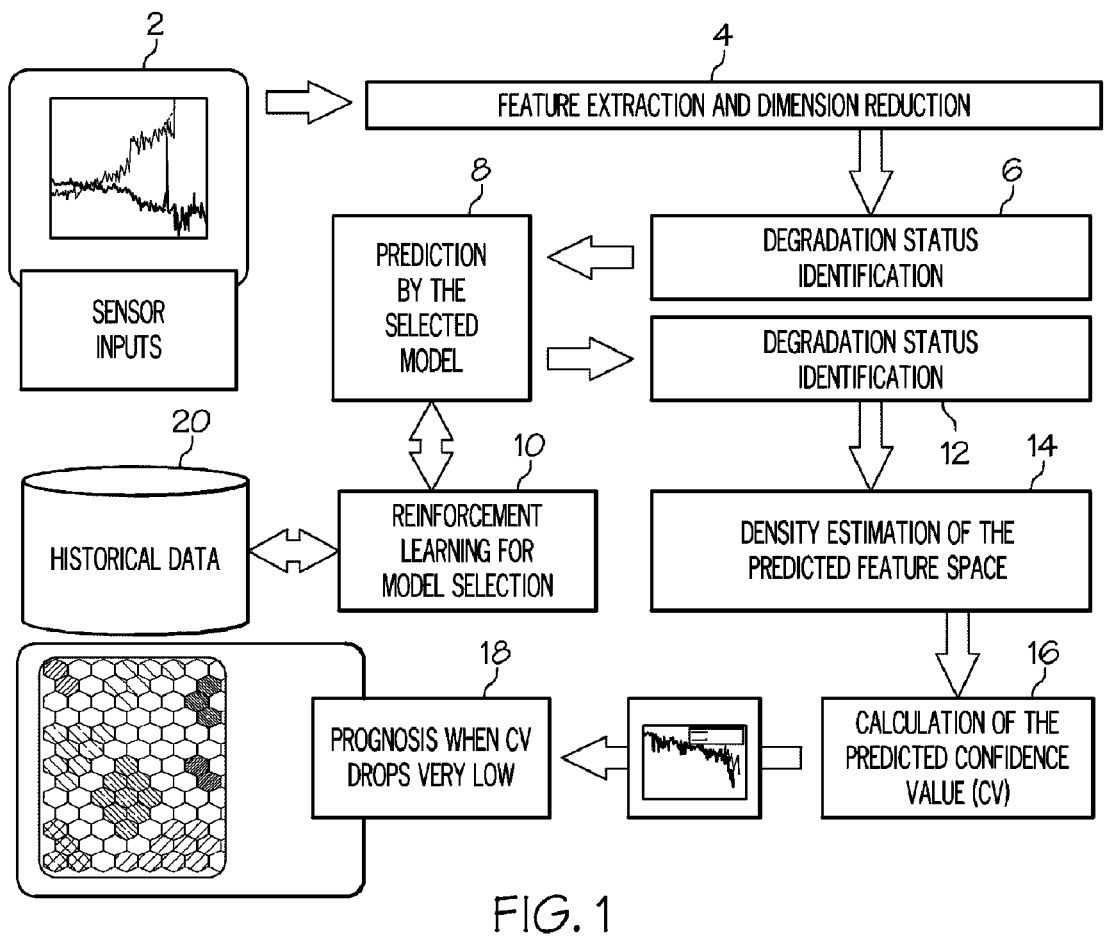
FIG. 1 depicts an exemplary framework for prognosing mechanical systems according to one or more embodiments shown and described herein.

One embodiment of the adaptive modeling for robust prognostics is illustrated in FIG. 1. The sensors 2 may be those normally used by the mechanical system (e.g., to measure position, velocity, etc.) or may be sensors specifically placed in the mechanical system to measure a particular parameter (e.g., vibration). The modeling system may read the measurement data from the sensors 2 and perform a feature extraction method at step 4 which will extract a performance related feature space from the raw sensor data. If the feature space is highly dimensional, reduction methods can be applied to reduce the dimension of the feature space. Based on the recently-obtained features, the degradation status will be identified at step 6. The most appropriate prediction model is selected according to the look-up table, which is the result of the reinforcement learning scheme. The selected prediction model will be applied to predict future trends of the features at step 8. The predicted feature space is generated by sampling between the predicted confidence intervals. At step 14, an enhanced density estimation method is developed to approximate the distribution of the predicted feature space as well as the distributions of the baselines. Finally, the performance index is calculated at step 16 by the overlap of the distribution of the predicted feature space and the distributions of the baselines. If the predicted performance index drops to a very low level, diagnosis will be applied at step 18 to determine the root causes of the degradation or failures. As part of selecting the appropriate prediction model, the method may reinforce the selection at step 10 by using historical data 20.

3 Feature Extraction and Dimension Reduction

3.1 Feature Extraction

Signal processing and feature extraction algorithms are used to decompose multi-sensory data into a feature space, which is related to the performance assessment or diagnosis tasks. A "feature" is a particular characteristic of the measurement signal, which may be extracted using time domain or frequency domain techniques. For example, one feature of a measurement signal may be its maximum amplitude within a given time period. Other features may be extracted as discussed herein. Time domain analysis is used to analyze stochastic signals in the time domain, which involves the comparison of two different signals. Time domain analysis uses the waveform for analysis as compared to frequency domain analysis, which instead uses the spectrum. Time domain analysis is useful when two different signals look very similar, even though the characteristics of the time signal are very different. The waveform immediately shows the differences, however frequency domain analysis may be used when time domain analysis does not provide enough information for further analysis. The Fourier Transform (FT) is a well-known algorithm in frequency domain analysis. It is used to decompose or separate the waveform into a sum of sinusoids of different frequencies. When dealing with a discrete or a sampled/digitized analog signal, the Discrete Fourier Transform (DFT) may be an appropriate Fourier analysis algorithm. In addition, some spectrum analysis tools, such as envelope analysis, frequency filters, side band structure analysis, Hilbert transform, and Cepstrum analysis, may be applied to various signal processing scenarios. Frequency domain analysis will not preserve the temporal information after the transformation of the time signals. Therefore, it may only be useful for stationary signals that do not contain frequency variations over time. Wavelet transform represents time signals in terms of a finite length or fast decaying oscillating waveform, which is scaled and translated to match the input signals. Wavelet Packet Transform (WPT), using a rich library of redundant bases with arbitrary time-frequency resolution, enables the extraction of features from signals that combine non-stationary and stationary characteristics. The WPT provides a very powerful tool for non-stationary signal analysis. The representation contains information both in time and frequency domain and it may achieve better resolution than time-frequency analysis.

3.1.1 Time Domain Analysis

In most of the cases, features from the time domain, such as mean, root mean square (RMS), kurtosis, crest factor, skewness, and entropy, are extracted from the waveform vibration data. The mean may be calculated as $$\bar{x} = \frac{1}{N} \sum_{i=1}^{N} x_i.$$

The RMS may be calculated as $$\mathrm{RMS} = \sqrt{\frac{\sum_{i=1}^{N}(x_i - \bar{x})^2}{N}}.$$

The kurtosis may be calculated as $$\frac{\sum_{i=1}^{N}(x_i - \bar{x})^4}{N \times \mathrm{RMS}^4}.$$

The crest factor may be calculated as $$\frac{\max(x_i) - \min(x_i)}{\text{RMS}}.$$

The skewness may be calculated as $$\frac{\sum_{i=1}^{N}(x_i - \bar{x})^3}{N \times \text{RMS}^3}.$$

And the entropy may be calculated as $$-\sum_{i=1}^{N}(x_i \cdot \log(x_i)).$$

In all of these time domain equations, N is the number of samples in a dataset, x is a series of a sampling data, and $\bar{x}$ is the mean value of the series x.

3.1.2 Frequency Domain Analysis

A Fast Fourier Transform (FFT) may be used to decompose or separate the waveform into a sum of sinusoids of different frequencies. When dealing with a discrete or a sampled/digitized analog signal, the Discrete Fourier Transform (DFT) may be the appropriate Fourier analysis tool. The DFT can be computed efficiently in practice using an FFT algorithm. The forward DFT of a finite-duration signal x[n] (with N samples) may be calculated by $$X[k] = \sum_{n=0}^{N-1} x[n] e^{-j\frac{2\pi}{N}nk}, \quad k = 0, 1, 2, \ldots, N-1.$$

By using the FFT algorithm, the sensor (e.g., vibration) signal is translated from time domain into its equivalent frequency domain representation. The frequency spectrum can be subdivided into a specific number of sub-bands. A sub-band is basically a group of adjacent frequencies. The center frequencies of these sub-bands have already been pre-defined as, for example, the ball bearing defect frequencies of a mechanical system: Ball Passing Frequency Inner-race (BPFI), Ball Passing Frequency Outer-race (BPFO), Ball Spin Frequency (BSF) and Foundation Train Frequency (FTF). The energy in each of these sub-bands centered at BPFI, BPFO and BSF is computed and passed on to the performance assessment models.

For further analysis on a certain characteristic frequency, the Hilbert transform is a commonly used transformation to obtain the envelope of the signal. The Hilbert transform is defined as $$H[x(t)] = \frac{1}{\pi} \int_{-\infty}^{\infty} \frac{x(t)}{t-\tau} d\tau,$$

where $\tau$ is the dummy time variable, x(t) is the time-domain vibration signal, and H[x(t)] is the Hilbert transform of x(t).

3.1.3 Wavelet/Wavelet Packet Analysis

Wavelet Packet Analysis (WPA) provides a powerful method for non-stationary signal analysis. For sustained mechanical defects, a Fourier-based analysis, which uses sinusoidal functions as base functions, provides an ideal candidate for extraction of these narrow-band signals. For intermittent defects, signals often demonstrate a non-stationary and transient nature. Wavelet packet transform, using a rich library of redundant bases with arbitrary time-frequency resolution, enables the extraction of features from signals that combine non-stationary and stationary characteristics. WPA is an extension of the wavelet transform (WT) which provides complete level-by-level decomposition. The wavelet packets are particular linear combinations of wavelets. The wavelet packets inherit properties such as orthogonality, smoothness, and time-frequency localization from their corresponding wavelet functions.

A wavelet packet is a function $$\Psi_{j,k}^i(t)$$

with three indices, where integers i, j, and k are the modulation or oscillation parameter, the scale parameter, and the translation parameter, respectively. The wavelet packet function may be represented by the following equation:

$$\Psi_{j,k}^i(t) = 2^{j/2} \Psi^i(2^j t - k).$$

Figure 2:
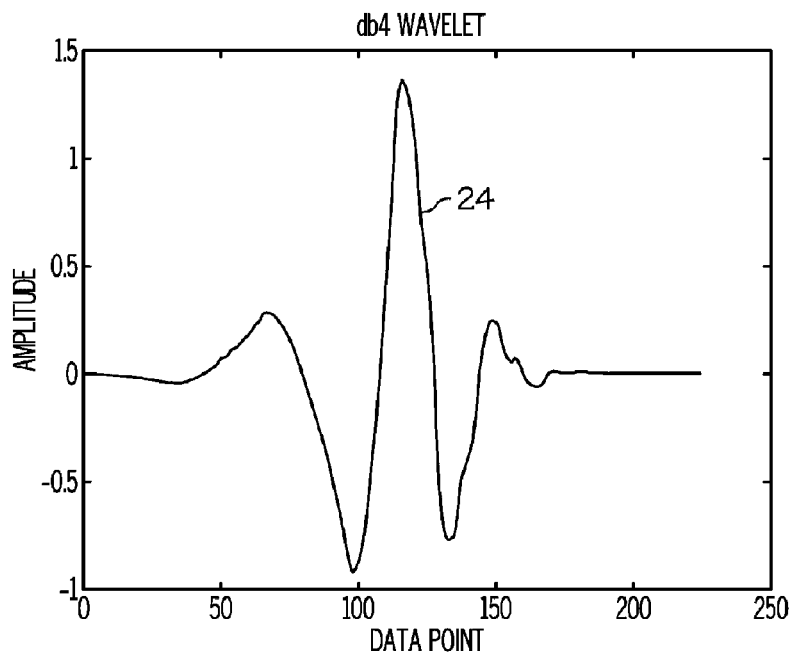
FIG. 2 depicts an exemplary DB4 wavelet according to one or more embodiments shown and described herein.

The first wavelet is the so-called mother wavelet or analyzing wavelet. Daubechies wavelet 24 (DB4), which is a kind of compactly supported wavelet, is widely used as the mother wavelet. This wavelet is shown in FIG. 2. The following wavelets $$\Psi^i \text{ for } i=2,3\ldots$$

are obtained from the following recursive relationships:

$$\Psi^{2i}(t) = \sqrt{2} \sum_{k=-\infty}^{\infty} h(k) \Psi^i(2t - k)$$

and $$\Psi^{2i+1}(t) = \sqrt{2} \sum_{k=-\infty}^{\infty} g(k) \Psi^i(2t - k),$$

where h(k) and g(k) are the quadrature mirror filters (QMF) associated with the predefined scaling function and the mother wavelet function. The wavelet packet coefficients (of a function f) can be computed by taking the inner product of the signal and the particular basis function $$c_{j,k}^i = \langle f, \Psi_{j,k}^i(t) \rangle = \int_{-\infty}^{\infty} f(t) \Psi_{j,k}^i(t) dt.$$

The wavelet packet node energy $$e_{j,k}$$

is defined as:

$$e_{j,k} = \sum_k c_{j,k}^{i^2}.$$

The energies of the nodes are used as the input feature space for performance assessment. Wavelet packet analysis may be applied to extract features from the non-stationary vibration data. Other types of analyzing wavelet functions may also be used, as is known in the art.

3.2 Feature Space Dimension Reduction

In some cases, it may be desirable to reduce the number of features in the feature space. Principal component analysis (PCA) is a statistical method that may be used for reducing feature space dimensionality by transforming the original features into a new set of uncorrelated features. The Karhunen-Loève transform (KLT) is a linear dimensionality selection procedure that is related to PCA. The goal is to transform a given data set X of dimension N to an alternative data set Y of smaller dimension M in the way that is optimal in a sum-squared error sense. Equivalently, it is seeking to find the matrix Y which is the Karhunen-Loève transform of matrix X: $Y = A^T X$, in which $A^T$ is the Karhunen-Loève transform matrix. By choosing the eigenvectors corresponding to the M largest eigenvalues of the correlation matrix of X, the mean square error (MSE) between the input X and its projection X' is minimized.

4 Machine Degradation Assessment by Self-Organizing Maps (SOM)

The purpose of degradation assessment is to evaluate the overlap between the most recent feature space and that during normal product operation. A quantitative measure will be calculated to indicate the degradation of the machine. SOM can generate a performance index to evaluate the degradation status based on the deviation from the baseline of normal condition. SOM is also a powerful classification and visualization tool which can convert multidimensional feature space into a 1-D or 2-D space. It forms a so-called "health map" in which different areas represent different failure modes for diagnosis purposes. The functionality of the SOM is discussed herein.

4.1 Background of Self-Organizing Maps (SOM)

SOM provides a way of representing multidimensional feature space in a one or two-dimensional space while preserving the topological properties of the input space. SOM is an unsupervised learning neural network which can organize itself according to the nature of the input data. The input data vectors, which closely resemble each other, are located next to each other on the map after training. An n-dimensional input data space can be denoted by:

$$x = [x_1, x_2, \ldots, x_n]^T.$$

The weight vector of each neuron j in the network has the same dimension as the input space and can be represented by $$\omega_j [\omega_{j1}, \omega_{j2}, \ldots, \omega_{jn}]^T, j = 1, 2, \ldots, m,$$

in which m is the number of neurons in the network. The Best Machining Unit (BMU) in the SOM is the neuron whose weight vector is the closest to the input vector in the input space. The inner product $$x^T \omega_j$$

can be used as an analytical measure for the match of x with $$\omega_j.$$

The Euclidean distance may be a better and more convenient measure criterion for the match of x with $$\omega_j.$$

The minimum distance defines the BMU. If $$\omega_c$$

is defined as the weight vector of the neuron that best matches the input vector x, the measure can be represented by $$\|x - \omega_c\| = \min\{\|x - \omega_j\|\}, j = 1, 2, \ldots, m.$$

After the BMU is identified in the iterative training process, the weight vectors and the topological neighbors of the BMU are updated in order to move them closer to the input vector in the input space. The following learning rule is applied $$\omega_j(t+1) = \omega_j(t) + \alpha(t) h_{j,\omega_c}(t)(x - \omega_j(t)),$$

in which $$h_{j,\omega_c}$$

denotes the topological neighborhood kernel centered on the BMU $$\omega_c.$$

A choice of the kernel function may be the Gaussian function $$h_{j,\omega_c} = \exp\left(-\frac{d_{j,\omega_c}^2}{2\sigma^2}\right),$$

in which $$d_{j,\omega_c}$$

is the lateral distance between the BMU $$\omega_c$$

and neuron j. The parameter σ is the "effective width" of the topological neighborhood. The function α(t) is the learning rate which monotonically decreases with the training time. In the initial phase which lasts for a given number of steps (e.g. first 1000 steps), α(t) starts with a value that is close to 1 and it can be linear, exponential, or inversely proportional to t. During the fine-adjustment phase which lasts for the rest of the training, α(t) should keep small values over a long time period.

4.2 SOM for Machine Degradation Extent Assessment

In most scenarios, only measurement of the normal operating conditions is available. SOM provides a performance index to evaluate the degradation condition when only normal measurement is available. For each input feature vector, a BMU can be found in the SOM trained only with the measurement in the normal operating state. The minimum quantization error (MQE) is defined as the distance between the input feature vector and the weight vector of the BMU. The MQE actually indicates how far away the input feature vector deviates from the normal operating state. The MQE is more particularly defined through the equation $$MQE = \|V_F - V_{BMU}\|,$$

in which $$V_F$$

is the input feature vector and $$V_{BMU}$$

is the weight vector of the BMU. Hence, the degradation trend can be measured by the trend of the MQE.

5 Prediction Models and Their Uncertainties

Auto-regressive moving average (ARMA) and recurrent neural network (RNN) are considered as two types of prediction models in this disclosure which may be used for prognosing mechanical systems. These two prediction models have different characteristics. Other types of prediction models may be used, as are currently known in the art or may be discovered in the future. There always exist errors between the real system and the estimated models by employing a training dataset due to imperfections in model assumptions, noises, and measurement. These errors are notated as model uncertainty. There are many potential root causes of uncertainty associated with fault conditions: faults exhibit varying signatures depending upon the location, cause, prevailing operating conditions, and the state of the component materials. For linear models, the model uncertainty processing techniques can be classified as active and passive approaches. The active approach is based on assumption that the noise can be characterized by some probability density functions. The passive approach is based on the adaptive threshold techniques. It may be difficult to identify and model all the objective and subjective uncertainties, but probability theories provide mathematical foundations for solving these issues. For simplicity, this disclosure deals with prediction model uncertainties using confidence boundaries derived from each prediction model.

5.1 Prediction Model 1—Auto-Regressive Moving Average (ARMA)

The Auto-Regressive Moving Average (ARMA) model consists of two parts, the autoregressive (AR) part and the moving average (MA) part. The AR (p) model can be represented by $$Z_t = \sum_{i=1}^{p} \Phi_i Z_{t-i} + \varepsilon_t,$$

in which $$Z_t, Z_{t-1}, Z_{t-2}, \ldots, Z_{t-p}$$

are deviations from $\mu$ (the mean about which the process varies), $$\Phi_i, i=1,2,\ldots,p$$

are the parameters of the model, and $$\varepsilon_t$$

is the error term. The MA (q) model can be denoted by $$Z_t = \varepsilon_t - \sum_{i=1}^{q} \theta_i \varepsilon_{t-i}, \quad i = 1, 2, \ldots, q,$$

in which $$Z_t$$

is the deviation from $\mu$, $$\theta_i, i=1,2,\ldots,q$$

are the parameters of the model and $$\varepsilon_t, \varepsilon_{t-1}, \varepsilon_{t-2}, \ldots, \varepsilon_{t-q}$$

again are the error terms. To achieve greater flexibility in the fitting of the actual time series, it may be advantageous to include both autoregressive and moving average terms in the model. So an ARMA (p, q) model refers to a model with p autoregressive terms and q moving average terms, which can be written as $$Z_t = \sum_{i=1}^{p} \Phi_i Z_{t-i} + \varepsilon_t - \sum_{i=1}^{q} \theta_i \varepsilon_{t-i}.$$

Optimized parameters of an ARMA (p, q) model can be estimated by historical data. To check the adequacy of the ARMA (p, q) model, an F-test statistical hypothesis test method can be applied. Other types of methods may be applied as well.

5.2 Uncertainty of ARMA Prediction

For a generalized ARMA (p, q) model, the values of l steps ahead of current time can be described as $$X_{t+l} = \hat{X}_t(l) + e_t(l) = \hat{X}_t(l) + (a_{t+l} + G_1 a_{t+l-1} + \ldots + G_{l-1} a_{t+1}),$$

where $$\hat{X}_t(l)$$

means l steps ahead prediction based on current moment t, $$a_t$$

is the "shock" value, and $$G_t$$

is the value of Green's function. It can be shown that statistically $$(X_{t+l}|X_t, X_{t-1}, \ldots) \sim Norm(\hat{X}_t(l), V[e_t(l)]) \sim Norm(\hat{X}_t(l), \sigma_a^2(1+G_1^2+G_2^2+\ldots+G_{l-1}^2)),$$

where $$\sigma_a^2$$

is the mean square error of the modeling process. Therefore the entire prediction with $100(1-\alpha)$ % level of uncertainty can be obtained as $$\hat{X}_t(l) \pm Z_{\alpha/2} \sigma_a^2 (1+G_1^2+G_2^2+\ldots+G_{l-1}^2).$$

5.3 Prediction Model 2—Recurrent Neural Network (RNN) with Particle Swarm Optimization (PSO)

5.3.1 Recurrent Neural Network (RNN)

A neural network has its own special characteristics, such as non-linear curve fitting, and is also widely used in industrial fields. A typical type of RNN consists of an input layer, a hidden layer, a context layer and an output layer. In some situations, the hidden layer contains multiple layers. The distinct connections of the context layer in RNN make its output sensitive to not only current input data but also historical input data, which is essentially useful for prediction.

If $$x_1, x_2, \ldots, x_n$$

are defined as input neurons and $$y_1, y_2, \ldots, y_n$$

are defined as hidden layer neurons, the mapping from the input layer to the output layer can be defined as the following equations $$S_j = \sum_{i=1}^{n} \omega_{ji} x_i + \theta_j,$$

in which $$\omega_{ji}$$

are the weights of connections between the input layer neurons and the hidden layer neurons, and $\theta_j$ is the bias of each input layer neuron. For RNN, $S_j$ is described as $$S_j = \sum_{i=1}^{m} W_{ji} A_j + \sum_{i=1}^{n} \omega_{ji} x_j + \theta_j,$$

in which m is the number of neurons in the context layer, $W_{ji}$ is the network weights for the context layer neurons and the hidden layer neurons, and $A_j$ is the internal network state at t−1. A transfer function or activation function can be employed, which is described as $y_j = f(S_j)$.

A popular representative of the transfer function is the logistic function from the family of sigmoid functions, which is described as $$f(S_j) = \frac{1}{1 + \exp(-S_j)}.$$

A back propagation (BP) algorithm may be used to train the neural network model. The weights will change according to the following equation $$\Delta \omega_{ji} = -K \frac{dE}{d\omega_{ji}} \Delta \omega_{ji} = -K \frac{dE}{d\omega_{ji}},$$

in which $\omega_{ji}$ is the weight of connections between neuron j and neuron i, E is the error function, and K is a constant proportionality. The learning algorithm will update the weights of the network to match the outputs with the desired target values in iterative steps; the iteration stops when a certain criterion (such as maximum iteration step, maximum iteration time, mean square error, etc.) is met.

5.3.2 Particle Swarm Optimization (PSO)

Particle swarm optimization (PSO) is a stochastic optimization technique based on a social metaphor of bird flocking or fish schooling. The particle swarm is an algorithm for finding optimal regions of complex search spaces through the interaction of individuals in a population of particles. The scenario of PSO can be supposed as follows: a group of birds are randomly searching food in an area where only one piece of food exists. The birds do not know where the piece of food is, but they know how far the food is in each step of the food searching procedure. The best and effective searching strategy is to follow the bird, which is the nearest to the food, in the entire flock.

The algorithm is initialized with a population of random solutions, called birds or particles which are updated during each iteration of the searching procedure. Each particle i has its current position vector $present_i$ and the velocity vector $v_i$.

The velocity vector directs the moving of the particles in the search space. The fitness values of all the particles are evaluated by the fitness function which is to be optimized. For each iteration step, the particles are updated by following two best fitness values. One is the best fitness value that each particle has achieved so far, which is noted as $pbest_i$.

The other one is the best fitness value that is obtained so far by any particle in the population, which is noted as $gbest_i$ After those two best fitness values are found, the velocity of the particle is updated by $v_i(t+1) = v_i(t) + c1 \cdot rand1 \cdot (pbest_i(t) - present_i(t)) + c2 \cdot rand2 \cdot (gbest_i(t) - present_i(t))$ where c1 and c2 are learning factors which are usually 2, rand1 and rand2 are random numbers between 0 and 1. After the velocity of the particle is updated, the position of the particle can be calculated by $present_i(t+1) = present_i(t) + v_i(t+1)$.

The PSO algorithm will continue until it achieves the maximum iterations or the minimum error criteria.

PSO has been proven to be a competitor to genetic algorithm (GA) in optimization problem solving. Both PSO and GA are initialized with random population, update the population with random techniques and share the abilities of handling the nonlinear fitness functions, but PSO doesn't have the genetic operators such as crossover and mutation. PSO only looks for the best solution in the population and shares information in a one-way mechanism, whereas, GA shares information with each other for all chromosomes. Even though the testing results show that PSO and GA outperform each other in different optimization scenarios, PSO tends to converge to the best solution quickly even in the local version in most cases and can be implemented in a much simpler way.

5.3.3 Optimization of the Initial Weights of the RNN with PSO

Figure 3:
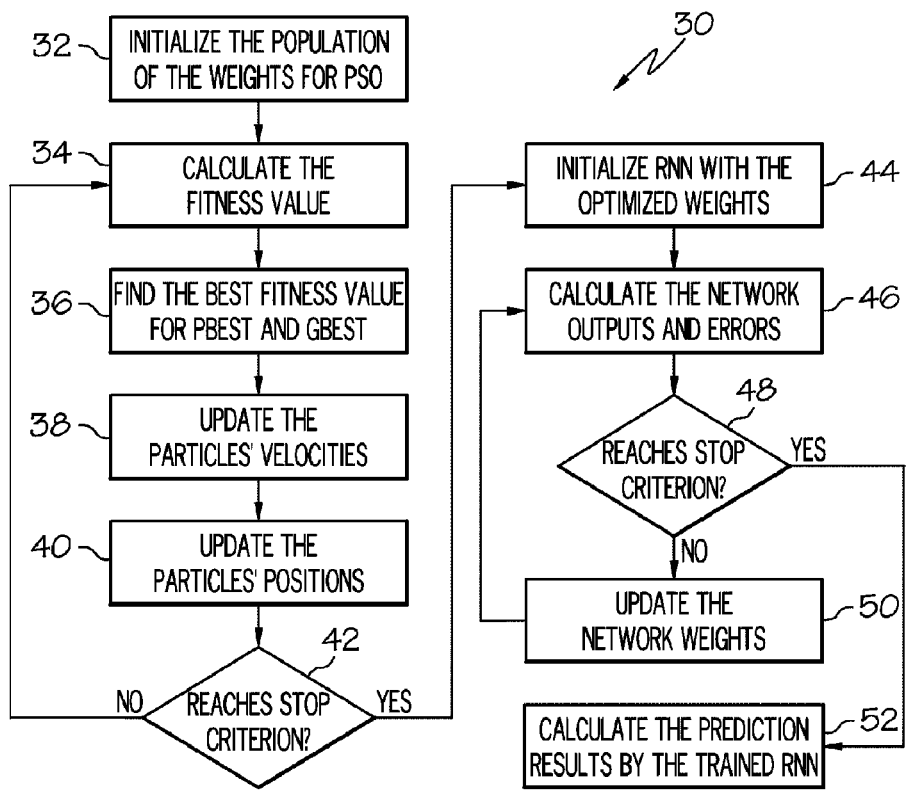
FIG. 3 depicts an exemplary flowchart of a recurrent neural network according to one or more embodiments shown and described herein.

FIG. 3 depicts a flowchart of one embodiment of the optimization 30 in which there are two major steps. The first step is the optimization of the initial weights of RNN using PSO, shown at step 32. The fitness function for PSO may be calculated as the mean square error (MSE) of the training error at step 34. The method next finds the best fitness value for $pbest_i$ and $gbest_i$ at step 36. The method updates the particle velocity and positions at steps 38 and 40, respectively. The PSO stops when it meets the stop criterion at step 42, where the second step begins to train the RNN with the optimized initial weights at step 44. The method calculates the network outputs and errors at step 46. The method determines whether the stop criterion has been reached at step 48. If not, the method updates the network weights at step 50 and returns to step 46.

After the stop criterion has been reached, the trained RNN is used to calculate the prediction results at step 52.

5.4 Uncertainty of Recurrent Neural Network (RNN) Prediction

The recurrent neural network (RNN) model can be considered as a nonlinear regression model, which can be applied to find a prediction interval by standard asymptotic theory. The nonlinear regression model can be defined as $$y_i = f(x_i; \theta) + \epsilon_i, i = 1, 2, \ldots, n,$$

where $$\epsilon_i \sim Norm(0, \sigma_i^2)$$

and $$x_i$$

and $$y_i$$

are independently and identically distributed (i.i.d.). Therefore the true value y at $$x = x_0$$

is $$y_0 = f(x_0; \theta) + \epsilon_0,$$

and the prediction value $\hat{y}$ is $$\hat{y}_0 = f(x_0; \hat{\theta}),$$

where $\hat{\theta}$ is close to the true value $\theta$ for large value n. The first order Taylor expansion of this equation is $$f(x_0; \hat{\theta}) \approx f(x_0; \theta) + f'_0(\hat{\theta} - \theta),$$

where $$f'_0 = \left( \frac{\partial f(x_0; \theta)}{\partial \theta_1}, \frac{\partial f(x_0; \theta)}{\partial \theta_2}, \ldots, \frac{\partial f(x_0; \theta)}{\partial \theta_p} \right).$$

Since $$E[y_0 - \hat{y}_o] \approx E[\epsilon_o] - f'_o E[\hat{\theta} - \theta]$$

and $$\text{var}[y_o - \hat{y}_o] \approx \text{var}[\epsilon_0] + \text{var}[f'_o(\hat{\theta} - \theta)] \approx \sigma^2 + \sigma^2 f'_o (F'F)^{-1} f_o,$$

where F is the Jacobian matrix of the neural network outputs with respect to its parameters, $$F = \left[ \left( \frac{\partial f(x_i; \hat{\theta})}{\partial \theta_j} \right)_{i=1:n} \right]_{j=1:p},$$

in which n is the number of samples and p is the number of parameters. The unbiased estimator of $\sigma^2$ is $$S^2 = \frac{\sum_{i=1}^{n}(y_1 - f(x_i; \hat{\theta}))^2}{n - p} (y_o - \hat{y}_0) \sim \text{Norm}(0, \sigma^2(1 + f'_o(F'F)^{-1} f_o)).$$

$S^2$ is asymptotically independent of $$(y_o - \hat{y}_o).$$

Hence, $$\frac{y_o - \hat{y}_o}{s\sqrt{1 + f'_o(F'F)^{-1} f'_o}} \sim t_{n-p}.$$

Therefore, an approximate $100(1-\alpha)\%$ level of uncertainty at $$y_o$$

can be obtained as $$\hat{y}_o \pm t_{n-p}^{\alpha/2} s[1 + f'_o(F'F)^{-1} f_o]^{1/2}.$$

5.5 Sampling between the Confidence Intervals

The prediction model takes into consideration uncertainties by returning predicted results which fall within a confidence interval. Monte Carlo sampling method may be used to sample the points within the confidence interval to form the predicted feature space, which is used to calculate a confidence value as discussed herein. For example, the dissociation rate may be given by $$L(q) = \frac{1}{2} \int dx, dp, \rho(x, p), \delta(y - q) \left| \frac{dy}{dt} \right| / \int dx, dp, \rho(x, p),$$

where $\rho(x, p)$ is the microcanonical density for an energy E, such that $$\rho_E(x, p) = \delta(E - \aleph(x, p)).$$

$\aleph$ represents the Hamiltonian for the system of interest and may contain general potential energy functions. The microcanonical ensemble dissociation rate constants for general interaction potentials may be evaluated by traditional Monte Carlo procedures. Other methods may be used to sample the points, as is known in the art.

6 An Adaptive Reinforcement Learning Framework for Prediction Model Selection

6.1 Overview of the Reinforcement Learning Framework

Reinforcement learning is the problem faced by an agent that must learn behavior through trial-and-error interactions with a dynamic environment. An agent is a learner or decision maker which can interact with the environment via perception or feedback. For example, at time t, the agent is in a state which is denoted by $$s_t \in S$$

represented by the environment, where S is the set of all possible states. In each step of iteration, the agent selects an action which is denoted by $$a_t \in A(s_t),$$

where $$A(s_t)$$

is the set of all possible actions in the current state $$s_t$$

by taking action $$a_t.$$

the state will change from $$s_t$$

to $$s_{t+1}.$$

A state signal that succeeds in retaining all relevant information is said to be Markov, or to have the Markov property. Assume there are a finite number of states and reward values for discrete systems, the environmental dynamics can be defined by the probability distribution:

$$P\{s_{t+1}=s'\in S, r_{t+1}=r\in R|s_t,a_t,r_{t-1},s_{t-1},a_{t-1},\ldots,r_1,s_0,a_0\},$$

for all $s' \in S$, $r \in R$, and all possible past events $$s_t,a_t,r_{t-1},a_{t-1},\ldots,r_1,s_0,a_0.$$

If the response of the environment at t+1 only depends on the state and action at t, the state signal is said to have the Markov property and the environmental dynamics can de defined simpler as $$P\{s_{t+1}=s'\in S, r_{t+1}=r\in R|s_t,a_t\}.$$

If the state transition is a deterministic Markov decision process, an action performed in state $$s_t$$

always transitions to the same next state $$s_{t+1}.$$

Alternatively, in a non-deterministic Markov decision process, a probability distribution function defines a set of potential successor states for a given action in a given state. The value of the state transition at time t+1 is observed by a scalar reinforcement which is denoted by $$r_{t+1} \in R.$$

At each iteration step, the agent selects an action according to the current policy which is denoted by π, which is a mapping from each possible state to the probabilities of choosing each available action. A policy π is better or equal to a policy π' if its expected return is greater than or equal to that of π' for all state-action pairs.

The value of taking action a in state s under policy π, denoted by $$Q^\pi(s,a)$$

(that is the action-value function for policy π), is defined as the expected return starting from s, taking action a and, therefore, following policy π is $$Q\pi(s,a) = E_\pi\{R_t | s_t = s, a_t = a\} = E_\pi\left\{\sum_{k=0}^{\infty} \gamma^k r_{t+k+1} \bigg| s_t = s, a_t = a\right\}$$

The optimal action-value function, which is denoted as Q*, under the optimal policy, which is denoted as π*, is defined as $$Q^*(s,a)=\max_\pi Q^\pi(s,a), \forall s\in S, a\in A(s).$$

The behavior of the agent should learn how to increase the long-run of the r∈R over time by a systematic trial-and-error way guided by a variety of algorithms (e.g. Q-learning) as is known in the art. The goal of reinforcement learning is to learn the optimal policy Q* from the experiment and maximizing the total amount of reinforcement in a long run.

The adaptive modeling aims to tackle the problem of selecting appropriate prediction models under different degradation statuses. The objective of the adaptive model selection is to obtain a mapping from each state to the probability of all possible prediction models that are taken into consideration in the modeling framework. The mapping provides a look-up table for model selection under different states. The reinforcement learning framework can be easily adapted for autonomously learning of this mapping. In the iterative process of the reinforcement learning, a prediction model is first chosen in a certain state according to the current optimal policy (probability of choosing a prediction model in a state). Then, the prediction output of the selected prediction model is compared with the real historical data. If the prediction accuracy is high, a positive reward is assigned to the prediction model; otherwise, the model is given a negative reward. As the iteration process proceeds, the reinforcement learning algorithm learns through the interaction with the environment to maximize the reward in a long run.

Figure 4:
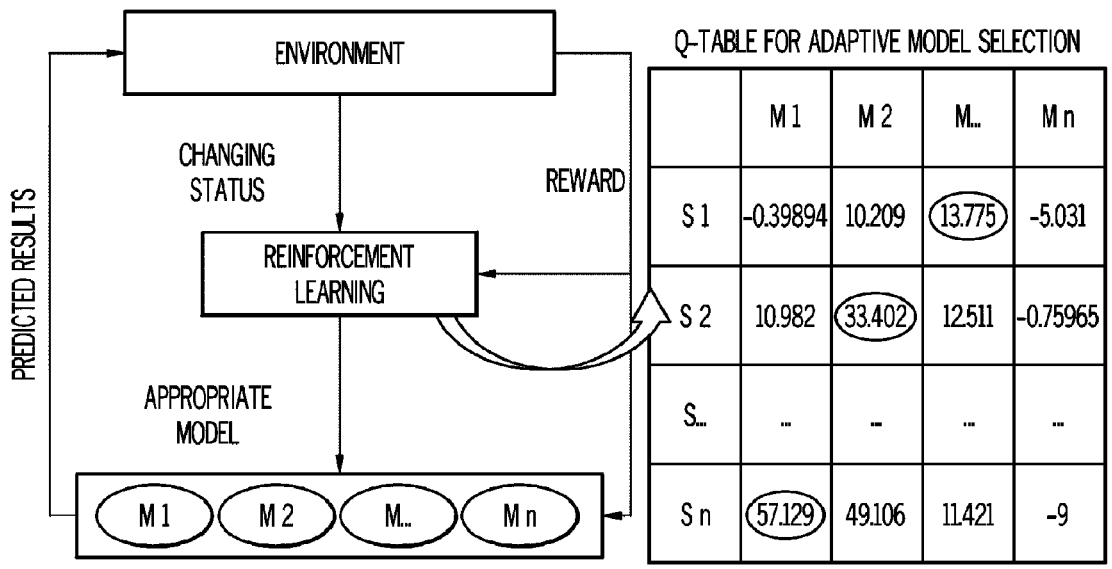
FIG. 4 depicts an exemplary adaptive prediction model selection table according to one or more embodiments shown and described herein.

Finally, as shown in FIG. 4, the training results are shown in a look-up table, which shows the Q-value for each state/action (prediction model) pair. The Q-value is determined by the sum of the (possibly discounted) reinforcements received when performing an action following a given policy. The most appropriate model at a certain state is determined by the largest Q-value for all the state/action pairs in the row of that state in the Q-table. If this reinforcement learning framework is used for a predetermined number of runs, the probability of choosing a certain action (i.e., the prediction model) in a specific state may be calculated via dividing the number of times the action was chosen by the total predefined number of runs, which forms the solution space for the prediction model selection. As an example, as shown in FIG. 4, if the state/action pair is S2, the highest Q-value for that row can be found at M2 (Model 2).

6.2 Problem Domain Mapping

To establish a framework for the adaptive model selection, it is necessary to map the relationship between the prediction task and the domain of reinforcement learning. The map of the relationship is defined as follows:

The environment of the disclosed reinforcement learning network is defined through historical data. The values of the historical data are utilized to calculate the reward of each prediction model that is incorporated in the framework.

The action is defined as the choice of different prediction models. The prediction models include various data-driven prediction algorithms. As one example, two types of prediction models (ARMA and RNN) are used. For each type of the prediction models, the structures and parameters are different. ARMA models can have different orders, such as ARMA (2, 1), ARMA (4, 3) and ARMA (12, 11) and so on, with different amounts of historical data used for training. RNN models can have various structures which are different in the number of input neurons, the number of hidden neurons, and the number of training samples. Each type of the two prediction models with different structures and parameters are considered as the available actions in the reinforcement learning framework.

The different states are defined by different degradation statuses identified by SOM as described herein. The MQE, described herein, is used as the indicator of the degradation status. The mean value and standard deviation of the MQE are used to define different states for the reinforcement learning framework. To estimate the maximum/minimum mean value and standard deviation from the historical data, a predefined number (N, positive integer) of the datasets, denoted by $$D_i, 1 \leq i \leq N$$

are sampled from the historical data by a fixed interval I from randomly generated start points. The maximum mean value of the MQE for all $$D_i$$

is denoted by $\mu_{max}$ and the minimum mean value of the MQE for all $D_i$ is denoted by $\mu_{min}$;

similarly, the maximum standard deviation of the MQE for all $D_i$ is denoted by $\sigma_{max}$ and the minimum standard deviation of the MQE for all $D_i$ is denoted by $\sigma_{min}$.

The interval of $[\mu_{min}, \mu_{max}]$ and $[\sigma_{min}, \sigma_{max}]$ are divided into m(m>1) and n(n>1) sub-intervals, respectively. If we define $\mu_{div} = (\mu_{max} - \mu_{min})/(m-1)$ and $\sigma_{div} = (\sigma_{max} - \sigma_{min})/(n-1), I_{\mu_i} i \in [1, m]$ and $I_{\sigma_j} j \in [1, n]$ can be denoted as $I_{\mu_i} = \mu_{min} + (i-1) \cdot \mu_{div}$ and $I_{\sigma_j} = \sigma_{min} + (j-1) \cdot \sigma_{div}$.

Therefore, totally (m×n) different states can be defined by the (m×n) combinations of different $I_{\mu_i}$ and $I_{\sigma_j}$.

To define the state of a dataset, the mean value $(\mu_D)$ and standard deviation $(\sigma_D)$ of the last M data points are calculated. The state is defined by the index of the minimum Euclidean distance of the pair $(\mu_D, \sigma_D)$ with all the m×n pairs $(I_{\mu_i}, I_{\sigma_j})$.

For state transition of each episode, a start point is randomly generated within the length of the historical data. For each step of an episode, a dataset with N data points is sequentially taken from the historical data until it reaches the end of the historical data or the number of the data points left is less than N.

The reward is based on prediction accuracy. A prediction model, which has high prediction accuracy, will be assigned a high/positive reward; otherwise, a low/negative reward will be given. Mean squared error (MSE), mean absolute deviation (MAD), and mean absolute percentage error (MAPE) can be used as the reward function. Several information criteria, such as adjusted coefficient of determination ($R^2$), Akaike's information criterion (AIC), Bayesian information criterion (BIC), the Fisher information criterion (FIC), the posterior information criterion (PIC), and Rissanen's predictive least squares criterion (PLS), can also be used as the reward function. Another reward function, which may be used due to its simplicity and less computational cost, is described below by the following equations. σ is the standard deviation of the observed real values. The reward is assigned to a prediction model as follows:

$r^i = +10, O_i \in (Or_i - \sigma, Or_i + \sigma)$, or $r^i = +5, O_i \in (Or_i + \sigma, Or_i + 2\sigma) or (Or_i - 2\sigma, Or_i - \sigma)$, or $r^i = -5, O_i \in (Or_i + 2\sigma, Or_i + 3\sigma) or (Or_i - 3\sigma, Or_i - 2\sigma)$, or $r^i = -10, O_i \in (-\infty, Or_i - 3\sigma) or (Or_i + 3\sigma, \infty)$ where $O_i, i \in [1, Nstep]$ are the output of the selected prediction model and $Or_i, i \in [1, Nstep]$ are the observed values. Nstep is the number of steps ahead for prediction. The reward for a selected prediction model can be calculated as follows $$r = \frac{\sum_{i=1}^{Nstep} (O_i - Or_i)}{Nstep}.$$

The policy, which defines the behavior of an agent, is the probability of choosing different prediction models in different states. The policy can also be seen as a mapping from the perceived environmental state to the actions to be taken. The optimal policy will be learned during the reinforcement learning.

Within the framework defined above, the iterative process of reinforcement learning can be run for a certain predefined number of steps. The results will be a "look-up" table (see FIG. 4) in which the rows are different states and the columns are different prediction models. The look-up table's values are the probability of choosing a model under a certain state. The "look-up" table will be updated when new observations are obtained.

6.3 Q-Learning

One-step Q-learning is defined by the following the simplest form:

$Q(s_t, a_t) \leftarrow Q(s_t, a_t) + \alpha[r_{t+1} + \gamma \max_a Q(s_{t+1}, a) - Q(s_t, a_t)]$, in which Q is the action-value function that directly approximates Q*; Q* is the optimal action-value function that is independent of the policy being followed;

$a_t$ is the action performed in state $a_t$ and the state transits to state $s_{t1}$;

$r_{t+1}$ is the reinforcement received when performing action $a_t$ at state $s_t$;

α is the learning rate; and γ is a scalar discount factor which functions as a mechanism of weighting the importance of the future rewards and the immediate rewards.

The pseudo code for Q-learning can be described as follows:
(1) Initialize Q values Q(s, a) arbitrarily
(2) Do (for each episode)
(3) Initialize s
(4) Do (for each step in an episode)
(5) Select a from s using the policy derived from Q
(6) Take action a and observe r and $S_{t+1}$ (7) Update Q values by:

$Q(s,a) \leftarrow Q(s,a)+\alpha[r+\gamma \max_a Q(s_{t+1},a)-Q(s,a)]$ (8)

$s \leftarrow s_{t+1}$ (9) while s is the termination state
(10) while all episodes end.

There are two stochastic mechanisms which may be used for action selection. One is the ϵ-greedy action selection which selects the best action with probability (1−ϵ), where ϵ∈[0,1]; otherwise it will select a random action. The other one is called Softmax action selection, which selects action $a_i$ with probability $e^{Q(s,a_i)}/\Sigma_j e^{Q(s,a_j)}$.

6.4 Algorithm of the Reinforcement Learning Framework for Prediction Model Selection The pseudo code of the reinforcement learning framework for prediction model selection is shown as follows:
(1) Initialize Q values Q(s,a)=0, ∀s∈S, a∈A(s)
(2) Do (for each episode)
(3) Randomly generate a starting point within the length of the historical data
(4) Initialize s for the data points in the first interval with length I
(5) Do (for each step in an episode)
(6) Select a prediction model a at state s using the policy derived from Q by ϵ-greedy selection method
(7) Train prediction model a and calculate the prediction results
(8) Calculate the reward r and observe the next state $s_{t+1}$ (9) Update Q values by:

$Q(s,a) \leftarrow Q(s,a)+\alpha[r+\gamma \max_a Q(s_{t+1},a)-Q(s,a)]$ (10)

$s \leftarrow s_{T+1}$

(11) while s is the termination state
(12) while all episodes end.

7 Improvement in the Accuracy of Confidence Value Calculation

The confidence value is calculated by evaluating the overlap between the distribution of the most recent feature space and that during normal operation. This overlap is continuously transformed into a confidence value (CV), ranging from 0 to 1 (0-abnormal and 1-normal) over time for evaluating the deviation of the recent behavior from normal behavior or baseline. After the predicted feature space is sampled between the prediction intervals, it is necessary to calculate the predicted performance index based on the predicted feature space and the baseline. CV is a quantitative measure of the machine degradation, which provides valuable information for the maintenance practitioners to decide whether to take an action or not in a very easy way. The rest of this section describes estimating the distributions of the feature spaces and methods of calculating the CV depending on different data availability.

7.1 Density Estimation by Boosting Gaussian Mixture Model (GMM)

GMM is an unsupervised learning method which is used to estimate the density distributions of the predicted feature space. GMM consists of a number of Gaussian functions which are combined to provide a multivariate density. Mixtures of Gaussians can be utilized to approximate an arbitrary distribution within an arbitrary accuracy. The mathematical model of GMM may be described as:

$$f(\bar{x}) = \sum_m p_m N(\Sigma_m, \bar{\mu}_m),$$

where $p_m$ are the weights for the $m^{th}$ mixture and $N(\Sigma_m, \bar{\mu}_m)$ denotes multivariate Gaussian distributions with mean vector $\bar{\mu}_m$ and covariance matrix $\Sigma_m$.

If the number of the mixtures is known, expectation maximization (EM) algorithm is usually used to find the proper parameters for the GMM based on the observed dataset.

7.1.1 Determine the Number of Mixtures by Bayesian Information Criterion (BIC)

Bayesian Information Criterion (BIC) may be used as a criterion to choose the number of mixtures for the GMM. Bayesian model comparison calculates the posterior probabilities by using the full information over the priors. The evidence for a particular hypothesis may be calculated by:

$P(D|h_i) = \int p(D|\theta, h_i) p(\theta|D, h_i) d\theta,$ where θ is defined as the parameters in the candidate model $h_i$.

D represents the training data set. For common cases, the posterior $$p(\theta|D,h_i)$$

can be peaked at $\hat{\theta}$ which maximizes the probability of the training data set. Therefore, the previous equation can be approximated as:

$$p(D|h_i) \approx P(D|\hat{\theta},h_i)p(\hat{\theta}|h_i)\Delta\theta,$$

where $$P(D|\hat{\theta},h_i)$$

is the best-fit likelihood and $$p(\hat{\theta}|h_i)\Delta\theta$$

is the Occam factor. If θ is k-dimensional and the posterior can be assumed to be Gaussian, the Occam factor can be calculated directly and yields $$P(D|h_i) \approx P(D|\hat{\theta}, h_i)p(\hat{\theta}|h_i)(2\pi)^{k/2}|H|^{-1/2},$$

where $$H = \frac{\partial^2 \ln p(\theta|D, h_i)}{\partial \theta^2}$$

is a Hessian matrix and measures how "peaked" the posterior is around the value $\hat{\theta}$. Then the BIC score is calculated by:

$$BIC(h_i|D) = \log P(D|h_i) - \frac{d}{2}\log N,$$

where d represents the number of parameters in $$h_i$$

and N is the size of data set. The candidate model, which has the largest BIC score, will be selected as the best model.

7.1.2 Density Boosting of GMM

Furthermore, a boosting method based on GMM is developed to approximate the distributions in order to achieve higher accuracy. Boosting is an algorithm aiming to improve the accuracy of any given learning algorithm or classifiers in a supervised learning scheme, particularly a weak learner algorithm. A weak learner class is a class that performs only slightly better than random guessing. A weak learner for the training set is created; then new component classifiers are added to form an ensemble with high accuracy on the training set through the use of a weighted decision rule. One algorithm comprises a method to continuously add weak learners until a desired low training error is achieved. At this point, each training pattern is assigned a weight which determines the probability of being selected. If the training pattern is correctly classified, the chance of being selected in the subsequent component classifier is reduced. If the training pattern is not correctly classified, the chance of being selected in the subsequent component classifier is increased. Patterns are chosen according to the new distribution to train the next classifier and the process is iterated. One issue of this algorithm is that the training error is dependent on the labels of the training patterns, and for unsupervised learning schemes the labels are not available. A gradient boosting methodology for the unsupervised learning scheme of density estimation method can also be used. This methodology will identify the coefficients and parameters of the weak learner which gives the largest local improvement at each iteration step according to the data log-likelihood criterion which is defined as:

$$DLL = \log \Sigma_{n=1}^{N} \alpha_n h_n(x),$$

in which N is the number of mixtures, x is the training dataset and $$\alpha_n$$

is the coefficient for each weak learner $$h_n(x).$$

BIC is used as a criterion to choose the number of mixtures for weak learners. Another boosting GMM has been introduced in which BIC is used to determine the number of mixtures for the GMM model. However, the number of mixtures should not be defined at the very beginning of the boosting procedure, since the sampled dataset will change according to the weights of the dataset at each iteration step. In addition, the EM algorithm, which is utilized to estimate the parameters for GMM, is sensitive to the initial parameters and it will likely converge to a local minimum.

To address the aforementioned issues, the disclosed GMM boosting algorithm is summarized as follows:

(1) Begin initialize $$L_0(x)$$

to be uniform on the domain of x and set the maximum iteration number $$T_{max}$$

and the maximum iteration number $$K_{max}$$

for EM. Set the maximum number of mixtures of the GMM as $$N_{max}$$

and stop the iteration if the performance does not improve for $$M_{max}$$

continuous steps (2) t←0
(3) do t←t+1
(4) Set $$w_i = 1/L_{t-1}(x_i)$$

(5) Sample the original dataset according to $$\omega_i$$

(6) n←0
(7) do n←n+1
(8) Use PSO to optimize the initial seeds of the k-means algorithm to initialize GMM
(9) Use EM to estimate the distribution of sampled dataset x with a GMM model $$h_t^n(x_i),$$

where $$h_t^n(x_i) = \sum_{n=1}^{N} p_n \text{Norm}(\mu_n, \delta_n)$$

and $$\text{Norm}(\mu_n, \delta_n) = \frac{1}{(2\pi)^{p/2}|\sigma_n|^{1/2}} e^{-\frac{1}{2}(x-\mu_n)'\sigma_n^{-1}(x-\mu_n)}$$

(9.1) k←0, initialize $$\hat{p}_n, \hat{\mu}_n, \hat{\sigma}_n$$

(9.2) do k←k+1
(9.3)

$$\hat{p}_n = \frac{1}{l}\sum_{i=1}^{l}\hat{p}(\omega=n\mid x_i,\hat{\theta})$$

(9.4)

$$\hat{\mu}_n = \frac{\sum_{i=1}^{l}\hat{p}(\omega=n\mid x_i,\hat{\theta})x_i}{\sum_{i=1}^{l}\hat{p}(\omega=n\mid x_i,\hat{\theta})}$$

(9.5)

$$\hat{\sigma}_n = \frac{\sum_{i=1}^{l}\hat{p}(\omega=n\mid x_i,\hat{\theta})(x_i-\hat{\mu}_n)(x_i-\hat{\mu}_n)'}{\sum_{i=1}^{l}\hat{p}(\omega=n\mid x_i,\hat{\theta})},$$

where $$\hat{p}(\omega=n\mid x_i,\hat{\theta}) = \frac{p(x_i\mid\omega=n,\hat{\theta}_{\omega=i})\hat{p}_n}{\sum_{j=1}^{N}p(x_i\mid\omega=j,\hat{\theta}_{\omega=j})\hat{p}_j} =$$

$$\frac{|\hat{\sigma}_n|^{-1/2}\exp\left(-\frac{1}{2}(x_i-\hat{\mu}_n)'\sigma_n^{-1}(x_i-\hat{\mu}_n)\right)\hat{p}_n}{\sum_{j=1}^{N}|\hat{\sigma}_j|^{-1/2}\exp\left(-\frac{1}{2}(x_i-\hat{\mu}_j)'\sigma_j^{-1}(x_i-\hat{\mu}_j)\right)\hat{p}_j}$$

(9.6) until k=
$K_{max}$
(10) until n=
$N_{max}$
(11) Use the BIC score to determine the best model
$h_t$
based on the sampled dataset x
(12) If
$\Sigma_i w_i h_t(x_i) < n$
break, where n is the size of training sample
(13) Using line search method to find
$\alpha_t = \arg\min_\alpha \Sigma_i - \log((1-\alpha)L_{t-1}(x_i) + \alpha h_t(x_i))$
(14) Set
$L_t = (1-\alpha_t)L_{t-1} + \alpha_t L_t$
(15) until t=
$T_{max}$
or
$\log(L_t(x_i)) - \log(L_{t-1}(x_i)) < 10^{-5}$
for
$M_{max}$
steps
(16) return
$L_t$
(17) end.

In step 8, the fitness function for the PSO is the sum of the within-cluster distances, which is described as:

$$S_w = \sum_{k=1}^{K}\sum_{i=1}^{n}\omega_{ik}\sum_{j=1}^{d}(x_{ij}-c_{kj})^2,$$

where K is the number of clusters, n is the number of patterns or samples, d is the number of dimension, $x_i$ is the ith pattern and $c_k$ is the center of the $k^{th}$ cluster, $\omega_{ik}$ is 1 if the $i^{th}$ pattern belongs to the $k^{th}$ cluster or 0 otherwise, and $$\sum_{k=1}^{K}\omega_{ik}=1.$$

7.2 Confidence Value (CV) Calculation Based on Feature Distributions
7.2.1 CV Calculation when only Normal Baseline is Available After the distributions of both the normal baseline and the predicted feature space are approximated through the use of a boosting GMM, the confidence value (CV), which indicates the performance of the machine (1 for normal, 0 for abnormal), is calculated by the overlap of the distributions following $$CV = \frac{|F(x)\cdot G(x)|_{L2}}{\|F(x)\|_{L2}\|G(x)\|_{L2}},$$

where F(x) and G(x) are the Gaussian mixture functions. If the two distributions overlap extensively, the confidence value will be near 1, which means the performance of the machine does not deviate from the baseline significantly. Otherwise, if the two distributions rarely overlap, the confidence value will be near 0, which means the performance of the machine deviates from the baseline significantly and the machine is probably acting abnormally.

Figure 5A:
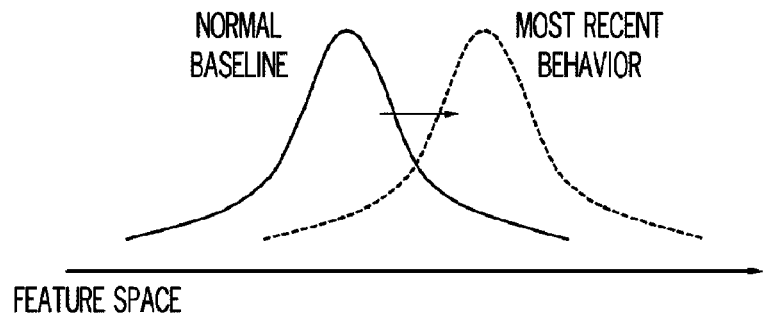
FIGS. 5A-B depict exemplary confidence value calculations according to one or more embodiments shown and described herein.

The calculation of the L2 distance of Gaussian mixtures is depicted in FIG. 5A. If the Gaussian mixture function contains more than two components, the same method can be easily extended to calculate the confidence value by adding necessary items which are the integration parts of the multivariate normal density functions.

Figure 5B:
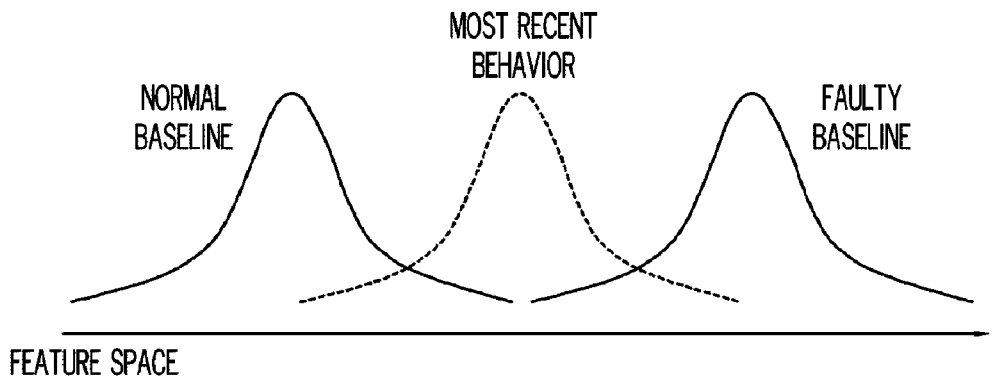

7.2.2 CV Calculation when Normal Baseline and Faulty Baseline are Both Available If measurements are available when the machine was running during the normal baseline, or under normal operating conditions, and before the machine was replaced due to a certain failure (i.e. during the faulty baseline), the CV is defined as a normalized average value of the data log-likelihood of both the baselines. The concept of the calculation of the CV is illustrated in FIG. 5B.

The distribution of the normal baseline is denoted by $$F_N(x)$$

and the distribution of the faulty baseline is denoted by $$F_F(x).$$

Notice that if density booting is applied to the distribution approximation of the baselines, the expression of the distributions is still mixture Gaussian function. The average log-likelihood is calculated by:

$$DLL_N = -\log \frac{1}{N1} \sum_{n=1}^{N1} F_N(x_n)$$

and $$DLL_F = -\log \frac{1}{N2} \sum_{n=1}^{N2} F_F(x_n).$$

$DLL_N$ can be considered as the distance from the predicted feature space to the distribution of the normal feature space $F_N$ because $DLL_N$ is a positive scalar due to the fact that $$\frac{1}{N1} \sum_{n=1}^{N1} F_N(x_n)$$

is between 0 and 1. The larger the $DLL_N$ is, the smaller the average mean log-likelihood of the predicted feature space to the distribution of the baseline $F_N$.

Similarly, $DLL_F$ can be considered as the distance from the predicted feature space to the distribution of the faulty feature space $F_F$.

Therefore, CV is defined as:

$$CV = 1 - \frac{DLL_N}{DLL_N + DLL_F} = \frac{DLL_F}{DLL_N + DLL_F}.$$

According to the definition of CV, the CV is larger if the distance from the predicted feature space to the normal baseline is smaller; the CV is smaller if the distance from the predicted feature space to the faulty baseline is smaller. This method is illustrated by the bearing example, discussed hereinafter.

8 Machine Failure Diagnosis by Self-Organizing Maps (SOM)

8.1 Diagnosis and Visualization

The purpose of diagnosis is to analyze the patterns embedded in the data to determine what previous observed fault has occurred. SOM has been introduced herein as a degradation assessment algorithm due to its advantage to deal with high-dimensional feature space. A rectangular SOM map is used as an example to demonstrate how SOM is used for diagnosis purposes.

During the training procedure of the SOM, the weight vector will move towards the input vector at each iteration step according to the neighbor updating rules. At the end of the training, the input vectors are kept in the map. In other words, the input vectors which closely resemble one another will locate next to each other on the SOM map after training. In this way, the weight vectors are grouped into clusters to match the distribution of the input vectors according to their distances to the input vectors. A unified distance matrix (U-matrix), which shows the distances between the neighbor units, may be used to visualize the clusters' structure in the SOM map.

Figure 6:
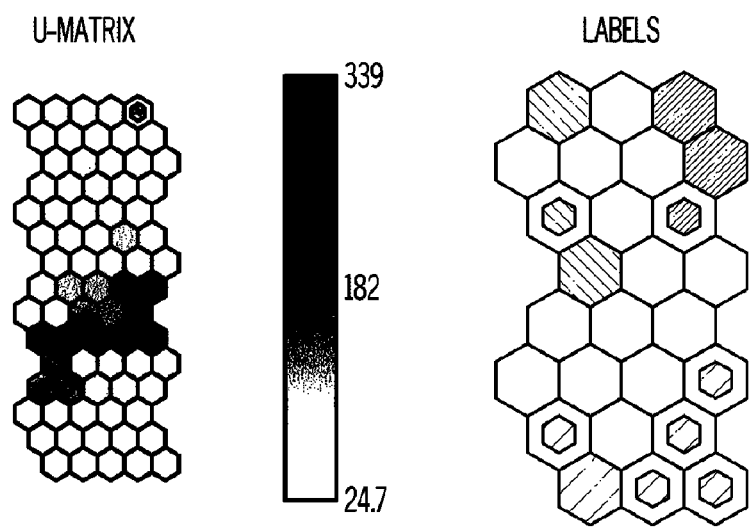
FIG. 6 depicts an exemplary presentation of the self-organizing map structure according to one or more embodiments shown and described herein.
Figure 7:
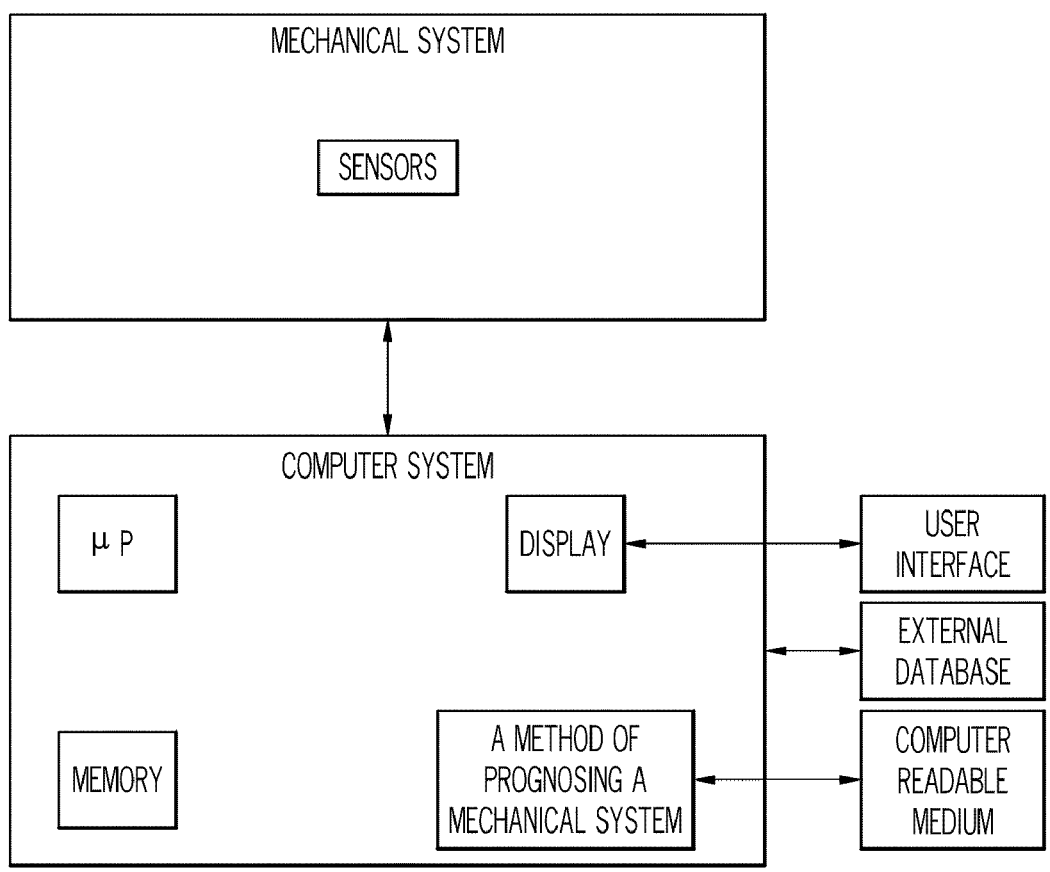
FIG. 7 depicts an exemplary computer system for prognosing a mechanical system according to one or more embodiments shown and described herein.

As shown in FIG. 6, high values of the U-matrix (left-hand side) indicate a cluster boundary; uniform areas of low values indicate clusters themselves. Note that the U-matrix visualization has many more hexagons than the map structure. This is because not only the distance values "at" the map units but also distances "between" map units are shown in the U-matrix. Larger distances have darker colors and smaller distances have lighter colors, as seen in the gray bar of FIG. 6. The set of hexagons on the right-hand side of FIG. 6 shows the structure of the SOM map itself and is used as a simple method to identify different failure modes for diagnosis. If the label information is available, a variant called "Supervised SOM" can be used to tune the representation of the distribution of all input vector obtained by the unsupervised learning SOM algorithm. Supervised SOM tunes this representation to discriminate better between the classes. In this case, the SOM units will be labeled with the available label information. Therefore, the testing features can be labeled by finding the BMU in the trained map as "hit points." The failure modes can be identified by the location of the hit points on the map. This method is illustrated by the bearing example discussed hereinafter.

8.2 Feature Selection for Diagnosis

An important issue for accurate fault diagnosis is to select the right features as the input of the diagnosis model. Some features might be trivial for diagnosis; these features tend to increase the computational burden and impair the performance of the classifier. Hence, the following two methods are disclosed for feature selection in diagnosis.

The first method is to determine which features were highly correlated with the output. The values of correlation coefficient r were calculated and ranked in descending order. The features with the corresponding higher r values were selected as the input to the SOM. The correlation coefficient r for one pair of input feature and output $$(\{(x_i, y_i)\}: i=1, \ldots, n)$$

is calculated by $$r = \frac{\sum_{i=1}^{n}(x_i - \bar{x})(y_i - \bar{y})}{\sqrt{\sum_{i=1}^{n}(x_i - \bar{x})^2 (y_i - \bar{y})^2}},$$

in which n is the number of samples in a dataset, $x_i$ is a series of a feature, $y_i$ is a series of the output, $\bar{x}$ is the mean value of the series $x_i$, and $\bar{y}$ is the mean value of the output.

The second method was the Fisher linear discrimination method which sought the projection directions that were efficient for discrimination. It was used to maximize the ratio of between-class scatter to the within-class scatter, which was preferred in such a multi-class classification task. A transformation matrix was obtained by selecting the eigenvectors corresponding to the non-zero eigenvalues of the matrix $$S_W^{-1} S_B.$$

The initial feature space x was then projected to a new feature space y by $$y = w^t x$$

(where $$w^t = S_W^{-1} S_B).$$

The rank of the matrix $$S_W^{-1} S_B$$

was c−1 and the projected feature space therefore had c−1 dimensions where c is the number of classes in the dataset.

9 Example

The following provides one example of using the methods described herein for prognosing a mechanical system comprising a rotary machine. Bearings are critical components of the rotary machine since their failures could lead to a chain of serious damages in the machine. Prediction and detection of rolling element-bearing faults has been gaining importance in recent years because of its detrimental effect on the reliability of rotating machines. Different datasets of bearings are utilized in the example to validate the disclosed methods. Roller bearing failure modes generally include roller failure, inner-race failure, outer-race failure, and a combination of these failures. The presence of different failure modes may cause different patterns of contact forces as the bearing rotates, which cause sinusoidal vibrations. Therefore, vibration signals were taken as the measurements for bearing performance assessment, prediction and diagnosis.

9.1 Setup

The setup included four test bearings on one shaft. The shaft was driven by an AC motor. Four bearings were installed on one shaft. A PCB 353B33 High Sensitivity Quartz ICPs Accelerometer was installed on each of the bearing housing. In this case, a Rexnord® ZA-2115 bearing was used for a run-to-failure test. Vibration data was collected every 20 minutes with sampling rate 20 kHz using a National Instruments® DAQCard™-6062E data acquisition card. For each data file, 20,480 data points were obtained. A magnetic plug was installed in the oil feedback to accumulate debris; debris is evidence of bearing degradation. At the end of the failure stage, the debris accumulated to a certain level causing an electrical switch to stop the test. In the test, one of the bearings finally developed a roller element defect.

9.2 Identification of the Degradation Status by SOM

A SOM was trained only with the feature space from the normal operation data. For each input feature vector, a BMU was found in the SOM. The distance measured between the input feature vector and the weight vector of the BMU, which was defined as the Minimum Quantization Error (MQE), actually indicated how far away the input feature vector deviated from the normal operation state. Hence, the degradation trend was visualized by the trend of the MQE. As the MQE increased, the extent of the degradation became more severe. Data from the first 500 cycles of the normal operation condition were used to train the SOM. After training, the entire life cycle data of the bearing with roller element defect was used for testing and the corresponding MQE values were calculated. In the first 1450 cycles, the bearing was in good condition, and the MQEs were near zero. From cycle 1450 to cycle 1650, the initial defects appeared and the MQE started increasing. The MQE continued increasing until approximately cycle 1750, this was an indication that the defects had become more serious. Subsequently, until around cycle 2050, the MQE dropped, this was due to the propagation of the roller defect becoming counterbalanced by the vibration. Shortly thereafter the MQE increased sharply until the bearing failed. It was verified that during the MQE increase that started after cycle 1500, the amount of debris that adhered to the magnetic plug increased. The debris was allowed to continue to increase until it accumulated to a certain level, which caused an electrical switch to stop the running of the test.

9.3 Results of the Prediction Modes

ARMA and RNN are considered two exemplary prediction models due to their different characteristics and prediction capabilities. ARMA is applicable to linear time-invariant systems whose performance features display stationary behavior, while it is unfeasible for use in a non-linear or dynamic process. Furthermore, since ARMA utilizes a small amount of historical data, it may not be able to provide good long-term prediction. RNN is good at modeling complex systems, which involve nonlinear behavior and unstable processes. RNN can take more historical data into the training procedure, which makes it is feasible to use for long-term prediction. However RNN has drawbacks in that there is no standard method to determine the structure of the network and its tendency to over fit.

To demonstrate the different performances of ARMA and RNN, the second principle component feature from cycle 1600 to cycle 1820 were normalized, and was used as data for training and testing the prediction models. Data from cycle 1600 to cycle 1770 (step 1 to step 170) were used for training and data from cycle 1771 to cycle 1820 (step 171 to step 220) were used for testing. Six ARMA models were adopted for prediction in the experiment: ARMA (2, 1), ARMA (4, 3), ARMA (6, 5), ARMA (8, 7), ARMA (10, 9) and ARMA (12, 11).

A RNN model was also adopted for prediction in the experiment. It had 105 input neurons, 7 hidden neurons, one output neuron, and utilizes 60 training samples. Due to the random initialization of the weights of RNN, which made the training performance unstable, PSO was used to optimize the initial weights of the RNN to ensure stable training performance. In the experiment, the swarm size was chosen as 10 and the number of iteration was set to be 500. The comparison of the training performance of RNN with and without PSO indicated that the training performance of RNN with PSO initialization was stable with very small variance for the 25 runs of RNN, while the training performance of RNN without PSO initialization had large variance for the 25 runs.

The aforementioned six ARMA models and the RNN with PSO initialization were used to predict the normalized feature from step 171 to step 220. The testing Mean Square Error (MSE) of each model was shown in the following table.

TABLE 1

| | Prediction Models | | | | | | |
|---|---|---|---|---|---|---|---|
| | ARMA (2, 1) | ARMA (4, 3) | ARMA (6, 5) | ARMA (8, 7) | ARMA (10, 9) | ARMA (12, 11) | RNN |
| MSE | 0.0112 | 0.011 | 0.0136 | 0.011 | 0.101 | 0.0117 | 0.0054 |

The results indicate that RNN outperforms the other six ARMA models for the prediction under the MSE criterion. The performances of the six ARMA models were very close to each other. The six ARMA models generated larger errors, while RNN achieved better results and captured the drop of the feature very close to the real value.

9.4 Reinforcement Learning for Adaptive Prediction Model Selection

The first principle component feature and the MQE values of the entire life cycle were used as the historical data to train the reinforcement algorithm to obtain the "look-up" table for model selection under various degradation statuses. The first principle component feature was of interest for prediction. MQE data was used to define the degradation status of the machine, which was used to define the state space in the reinforcement learning framework.

One purpose was to validate whether it is feasible for the reinforcement learning algorithm to learn the optimal policy to select appropriate algorithms in different states after the training. The aforementioned six ARMA models were used as agents in the reinforcement learning framework. A first order linear model with fixed parameters was also used as another agent in the reinforcement learning framework for comparison with the ARMA models. The first order linear model was described as $y=-100x+0.8$. This agent cannot achieve good results for most of the situations; it was added into the reinforcement learning framework in order to determine whether the algorithm can avoid choosing this agent or not after training.

The parameter settings of the Q-learning are described as follows. The maximum number of episode was set to be 1000. The maximum of steps in each episode was also set to be 1000. The state transition interval was set to be 50. A state space with 9 different states was generated by different mean values and standard deviations of the MQE values. The number of prediction steps ahead was set to be 30 for each agent. The learning rate was set to be 0.5. Discount factor was chosen to be 0.2 to weigh more on the current rewards. The probability of a random action selection was set to be 0.1 in order to obtain more "exploration" of all the actions in the action set for better choice. After the learning, a Q-value table was obtained for all the state-action pairs, shown in the table below. The most appropriate prediction model can be selected according to the highest Q-value for the state-action pairs.

TABLE 2

| | ARMA (2, 1) | ARMA (4, 3) | ARMA (6, 5) | ARMA (8, 7) | ARMA (10, 9) | ARMA (12, 11) | O1 Linear Model |
|---|---|---|---|---|---|---|---|
| State 1 | −0.1933 | 9.3602 | 1.4327 | 0.7787 | 0.0881 | 0.6094 | −8.2271 |
| State 2 | 7.6657 | 6.6293 | 8.1089 | 6.9330 | 8.6360 | 7.4592 | −9.3422 |
| ... | ... | ... | ... | ... | | | |
| State 9 | 5.4819 | 6.5875 | 9.3307 | 5.6198 | 3.2192 | 6.4952 | −9.24 |

ARMA (4, 3) had the highest Q-value in state 1 and ARMA (10, 9) had the highest Q-value in state 2. Therefore, those two models should be selected for prediction in state 1 and state 2, respectively. The order one linear model with fixed parameters had all negative Q-values in all the states; hence, it will not be chosen for prediction no matter in which state the machine was. In the experiment, the same reinforcement learning frame was run for 9 times repeatedly. For each time, the best action was selected according to the highest Q-value. This showed that the Q-values were similar for the entire state-action space for the 9 runs but not exactly the same. The probability of the best state-action pair can be calculated from the 9 runs by calculating the number of times that one action had been chosen as the best action in each state. Hence, the most appropriate action in each state can be selected according to the highest probability of been chosen in each state. If the probabilities were equal to two actions in the same state, the simpler model will be chosen according to the Occam's razor (i.e., the simplest explanation is the best). The purpose of selecting the simpler model was to avoid over fitting problems.

9.5 Diagnosis

Roller bearing failure modes generally include roller failure, inner-race failure, outer-race failure, and a combination of these failures. The presence of different failure modes may cause different patterns of contact forces as the bearing rotates, which cause sinusoidal vibrations. If the confidence values predicted drop to a very low level, a very interesting task is trying to determine what kind of failure the bearing has developed. The SOM method described herein was employed for diagnosis for bearings. The results were a "health map" which showed different failure modes of the bearing.

In this industrial example, a SKF32208 bearing was used, with an accelerometer installed on the vertical direction of its housing to obtain vibration signals. The sampling rate for the vibration signals was 50 kHz. 8192 data points were obtained and saved in one data file. The bearings were artificially made to have roller defect, inner-race defect and outer-race defect and 4 different combinations of the single failures respectively. The vibration signals of 8 different types of bearing states were identified, which were identified based on the following two steps.

Step 1: The BPFI, BPFO and BSF for this case were calculated as 131.73 Hz, 95.2 Hz and 77.44 Hz, respectively. The features were extracted from the raw vibration data, which function as the input vectors for the SOM.

Step 2: The health map was trained. The SOM toolbox developed by Helsinki University of Technology was used. The input vector of a specific bearing defect was represented by a cluster of BMUs on the map, which formed a region indicating the defect.

After training the SOM, a health map was obtained, which showed eight areas indicating the normal status, roller defect, inner-race defect, outer-race defect, outer-race & roller defect, outer-race & inner-race defect, inner-race & roller-defect and outer-race & inner-race & roller defect, respectively. With new data coming in, their extracted features were fed into the trained SOM, and their "hit points" on the health map represented the failure mode of the bearing.

Further examining the 14 features, we found some features might be trivial ones for bearing performance assessment and diagnosis. As such these features tended to increase the computational burden and impaired the performance of the classifier. Hence, the following two methods described herein were applied and compared for feature selection.

The first method was to find out which features were highly correlated with the output. The values of correlation coefficient r were calculated and ranked in descending order. The features with the corresponding higher r values were selected as the input to the SOM. In this case, 7 features with r values higher than 0.5 were selected. The selected features were sub bands centered at 1× and 2× of BSF, BPFI, and BPFO in the frequency domain, and the RMS value in the time domain.

The second method was the Fisher linear discrimination method which sought the projection directions that were efficient for discrimination. It was used to maximize the ratio of between-class scatter to the within-class scatter, which was preferred in such a multi-class classification task.

Repeated holdout validation was used to test the generalization quality of the model. Random samples were selected for each of the 8 classes. The proportion of the samples selected in each class was specified by a certain holdout rate. For example, the holdout rate of 0.1 means that 10% of the samples are randomly selected for testing and the remaining 90% of the samples are used for training. In this case, 5 holdout rates (0.1, 0.2, 0.3, 0.4 and 0.5) were applied. For each holdout rate, 50 trials were carried out repeatedly, and then the average precision rate was calculated.

The above-mentioned embodiments of the present invention may be implemented using hardware, software or a combination thereof and may be implemented in one or more microprocessor based systems, such as a workstation, a portable computer or other such processing systems, such as personal digital assistants (PDAs), application specific devices, and the likes. When implemented on a microprocessor based system, a microprocessor executes the above-mentioned processes (e.g., extracting features, decomposing data, selecting a prediction model, generating a predicted feature space, generating a confidence value, providing a status of mechanical system based at least in part on the generated data, etc.), interfacing with memory (e.g., local and/or remote via wired and/or wireless communications) such as for retrieving and storing the processes, results, and data (e.g., measurement data, mechanical system data, prediction models, reinforcement learning model, etc.), interfacing with a display for providing status, selection choices, data, and results, and interfacing with user interface(s) for receiving input (e.g., selection, navigation, etc.). Embodiments of the invention may also be provided as a computer product, such as contained in a conventional computer readable medium having stored therein computer instructions to cause a microprocessor to execute the above-mentioned processes of the present invention. As taking the embodiments described above and implementing them on such microprocessor based systems and/or a computer readable medium is well within the abilities of one skilled in the related art, for brevity, no further discussion is provided.

While particular embodiments and aspects of the present invention have been illustrated and described herein, various other changes and modifications may be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A method of prognosing a mechanical system comprising:
    receiving measurement data corresponding to the mechanical system;
    extracting one or more features from the received measurement data by decomposing the measurement data into a feature space;
    selecting a prediction model from a plurality of prediction models for one or more features based at least on part on a degradation status of the mechanical system and a reinforcement learning model, wherein:
        the reinforcement learning model is defined by a plurality of states, each state corresponding to a particular degradation status;
        the reinforcement learning model comprises a Q-value for each prediction model at each state and
        the selected prediction model is the prediction model having largest Q-value at a particular state;
    generating a predicted feature space by applying the selective prediction model to the feature space;
    generating a confidence value by comparing the predicted feature space with a normal baseline distribution, a faulty baseline distribution, or a combination thereof; and
    providing a status of mechanical system based at least in part on the confidence value.

2. A method as claimed in claim 1 wherein the measurement data comprises current data, voltage data, vibration data, pressure data, temperature data, acoustic emissions, or combinations thereof.

3. A method as claimed in claim 1 wherein the one or more features comprises one or more time domain features, one or more frequency domain features, or combinations thereof.

4. A method as claimed in claim 3 wherein the method further comprises obtaining the frequency domain features by applying a Fourier transform to stationary signals within the measurement data, and applying a wavelet packet transform to non-stationary signals within the measurement data.

5. A method as claimed in claim 1 wherein the features are extracted by a time domain analysis, a frequency domain analysis or combinations thereof.

6. A method as claimed in claim 1 wherein the method further comprises dimensionally reducing the feature space to generate a reduced set of uncorrelated features from the features within the feature space.

7. A method as claimed in claim 6 wherein dimensionally reducing the feature space further comprises applying a principal component analysis, a Karhunen-Loéve transform, or a combination thereof to the feature space.

8. A method as claimed in claim 1 wherein the degradation status of the mechanical system is determined by comparing the feature space with the normal baseline feature space.

9. A method as claimed in claim 1 wherein the degradation status is based on a performance index generated by a self-organizing map trained with measurement data of a normal operating state.

10. A method as claimed in claim 9 wherein the performance index is the difference between an input vector corresponding with the feature space and a weight vector.

11. A method as claimed in claim 1 wherein the plurality of prediction models comprises one or more auto-regressive moving average models, one or more recurrent neural network models, or combinations thereof.

12. A method as claimed in claim 1 wherein the states are based, at least in part, on a performance index generated by a self-organizing map trained with measurement data of a normal operating state.

13. A method as claimed in claim 12 wherein the Q-values are developed by an iterative learning process.

14. A method as claimed in claim 13 wherein the iterative learning process comprises:
choosing a prediction model in a particular state;
generating a predicted output;
comparing the predicted output with a real value of historical data; and
assigning a reward value to the prediction model in the particular state such that a positive reward value is assigned when predicted output has a relatively high prediction accuracy and a negative reward value is assigned when the predicted output has a relatively low prediction accuracy.

15. A method as claimed in claim 14 wherein the Q-value for each predictive model comprises a summation of a plurality of reward values based on a plurality of prediction outputs at the particular state.

16. A method as claimed in claim 1 wherein the predictive feature space is approximated by a density estimation method.

17. A method as claimed in claim 16 wherein the density estimation method comprises a boosting Gaussian mixture model.

18. A method as claimed in claim 1 wherein:
the confidence value is a value between zero and one; and
the confidence value corresponds to an overlap region of the predicted feature space and the normal baseline distribution such that a relatively high confidence value corresponds with a relatively large overlap region and a relatively low confidence value corresponds with a relatively small overlap region.

19. A method as claimed in claim 1 wherein:
the confidence value is a value between zero and one;
the confidence value is based on a comparison of the predicted feature space with the normal baseline distribution and the faulty baseline distribution; and
the confidence value is greater when the predicted feature space is closer to the normal baseline distribution than the faulty baseline distribution than when the predicted feature space is closer to the faulty baseline distribution than the normal baseline distribution.

20. A method as claimed in claim 1 wherein the method further comprises providing a mechanical system diagnosis indicating one or more faults.

21. A method as claimed in claim 20 wherein providing the mechanical system diagnosis further comprises inputting features into a trained self-organizing map to generate and display a health map.

22. A method as claimed in claim 21 wherein the health map comprises a plurality of regions indication a plurality of corresponding failure modes.

23. A method of prognosing a mechanical system comprising:
receiving measurement data corresponding to the mechanical system;
extracting one or more features from the received measurement data by decomposing the measurement data into a feature space;
selecting a prediction model from a plurality of prediction models for one or more features based at least on part on a degradation status of the mechanical system and a reinforcement learning model;
generating a predicted feature space by applying the selective prediction model to the feature space;
generating a confidence value by comparing the predicted feature space with a normal baseline distribution, a faulty baseline distribution, or a combination thereof wherein:
the confidence value is a value between zero and one; and
the confidence value corresponds to an overlap region of the predicted feature space and the normal baseline distribution such that a relatively high confidence value corresponds with a relatively large overlap region and a relatively low confidence value corresponds with a relatively small overlap region; and
providing a status of mechanical system based at least in part on the confidence value.

* * * * *